United States Patent
Juri

(10) Patent No.: US 11,262,335 B2
(45) Date of Patent: Mar. 1, 2022

(54) CHROMATOGRAPHY DETECTOR

(71) Applicant: SHIMADZU CORPORATION, Kyoto (JP)

(72) Inventor: Yuko Juri, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 322 days.

(21) Appl. No.: 16/726,458

(22) Filed: Dec. 24, 2019

(65) Prior Publication Data

US 2020/0240962 A1 Jul. 30, 2020

(30) Foreign Application Priority Data

Jan. 28, 2019 (JP) .............................. JP2019-012594

(51) Int. Cl.
*G01N 30/60* (2006.01)
*G01N 30/74* (2006.01)
*G01N 30/02* (2006.01)
*B01D 15/08* (2006.01)

(52) U.S. Cl.
CPC ......... *G01N 30/6047* (2013.01); *G01N 30/74* (2013.01); *B01D 15/08* (2013.01); *G01N 2030/027* (2013.01)

(58) Field of Classification Search
CPC ............... G01N 30/6047; G01N 30/74; G01N 2030/027; G01N 30/88; G01N 2030/8809
See application file for complete search history.

(56) References Cited

U.S. PATENT DOCUMENTS

| 5,444,807 | A * | 8/1995 | Liu ........................ G01N 30/74 |
| | | | 204/452 |
| 9,950,278 | B1 * | 4/2018 | Zelechonok ........... B01D 15/22 |
| 10,921,296 | B2 * | 2/2021 | Hasegawa .............. G01N 30/60 |
| 2016/0121322 | A1 * | 5/2016 | Fuller .................. G01N 33/487 |
| | | | 436/501 |
| 2020/0025727 | A1 * | 1/2020 | Hasegawa .......... G01N 30/6047 |

FOREIGN PATENT DOCUMENTS

| CN | 203838060 U | * | 9/2014 |
| CN | 104749140 A | * | 7/2015 |
| CN | 106053392 A | * | 10/2016 |
| CN | 207515960 U | * | 6/2018 |
| JP | 2004309243 A | | 11/2004 |
| RU | 2367774 C1 | * | 9/2009 |
| RU | 2589374 C1 | * | 7/2016 |

* cited by examiner

*Primary Examiner* — Francis C Gray
(74) *Attorney, Agent, or Firm* — Renner, Otto, Boisselle & Sklar, LLP

(57) ABSTRACT

A chromatography detector comprises: a flow cell with a flow path where the sample and a solution flow, the flow cell including outlet tubing that discharges the sample and the solution from the flow path; a connecting member configured to connect the outlet tubing of the flow cell and external tubing outside the flow cell; a wall member including a through-hole; a securing member configured to secure the connecting member to the wall member; and a tray below the securing member. The securing member includes a holder configured to hold the connecting member, an attachment configured to be inserted through the through-hole of the wall member, and a fluid guide formed in such a manner as to, upon the solution leaking out of the connecting member, guide the leaked solution to the tray.

8 Claims, 6 Drawing Sheets

CHROMATOGRAPHY DETECTOR

BACKGROUND OF THE INVENTION

1. Technical Field

The present invention relates to a chromatography detector.

2. Background Art

An analysis target sample, together with a solution, is introduced into a separatory column in a liquid chromatograph apparatus. The sample passes through the separatory column to be separated into components. The sample, together with the solution, is then introduced into a flow cell of a chromatography detector (hereinafter simply referred to as the detector). The sample introduced into the flow cell is optically detected to generate a chromatogram. The sample that has passed through the flow cell, together with the solution, is discharged to the outside of the detector through external tubing connected to outlet tubing of the flow cell.

The outlet tubing of the flow cell and the external tubing are connected by a connecting member. If the connection by the connecting member between the outlet tubing and the external tubing is insufficient here, the fluid leaks out of the portion connected by the connecting member. A fluid leak detection apparatus that detects a fluid leak is generally provided to the detector (refer to, for example, Patent Document 1 (JP-A-2004-309243)). However, a fluid leak itself is not prevented. Therefore, the occurrence of a fluid leak may lead to the deterioration of another member, such as an optical system, of the detector due to the adhesion of the solution to the member.

Especially, the connecting member may be secured in a through-hole of a wall member provided to the detector. In this case, the leaked solution spreads over a wide area through the through-hole of the wall member. Accordingly, the above problem becomes more pronounced.

SUMMARY OF THE INVENTION

An object of the present invention is to provide a chromatography detector that can be prevented from deteriorating due to a fluid leak.

A chromatography detector that detects components of a sample having passed through a separatory column in a chromatograph apparatus, the chromatography detector comprises: a flow cell with a flow path where the sample and a solution flow, the flow cell including outlet tubing that discharges the sample and the solution from the flow path; a connecting member configured to connect the outlet tubing of the flow cell and external tubing outside the flow cell; a wall member including a through-hole; a securing member configured to secure the connecting member to the wall member; and a tray below the securing member. The securing member includes a holder configured to hold the connecting member, an attachment configured to be inserted through the through-hole of the wall member, and a fluid guide formed in such a manner as to, upon the solution leaking out of the connecting member, guide the leaked solution to the tray.

According to the present invention, it is possible to prevent the deterioration of the chromatography detector due to a fluid leak.

The chromatography detector further comprises: a light emitter configured to emit light to the sample flowing through the flow path of the flow cell; a light receiver configured to receive the light that has been emitted by the light emitter and has passed through the sample, and output a signal indicating the amount of light received; and a casing. The wall member partitions an area in the casing into a first and a second area, the light emitter and the light receiver are placed in the first area in the casing, and the connecting member and the tray are placed in the second area in the casing.

The fluid guide is formed in such a manner as to extend toward the tray.

The securing member further includes a base extending in an up-and-down direction, the holder is formed in such a manner as to extend from the base in one direction intersecting with the up-and-down direction, the attachment is formed in such a manner as to extend from the base in a direction opposite to the one direction, and the fluid guide is formed in such a manner as to extend from the base toward the tray.

The holder includes an upper holder and a lower holder below the upper holder, the connecting member is held by the upper and lower holders, and the fluid guide is formed in such a manner as to extend from the lower holder toward the tray.

Upon the solution leaking out of the connecting member, the fluid guide guides the leaked solution to the tray without being guided to the through-hole along the lower holder.

The fluid guide extends diagonally downward.

The securing member further includes a contact portion, the contact portion is formed in such a manner as to protrude to the front from a substantially center portion of the base in the up-and-down direction, an end surface at a distal end of the contact portion has substantially the same shape as an outer peripheral surface of the connecting member, and the distal end of the contact portion comes into contact with the outer peripheral surface of the connecting member between the upper holder and the lower holder.

DETAILED DESCRIPTION OF THE EXEMPLARY EMBODIMENTS

(1) Configuration of Chromatograph Apparatus

Figure 1:
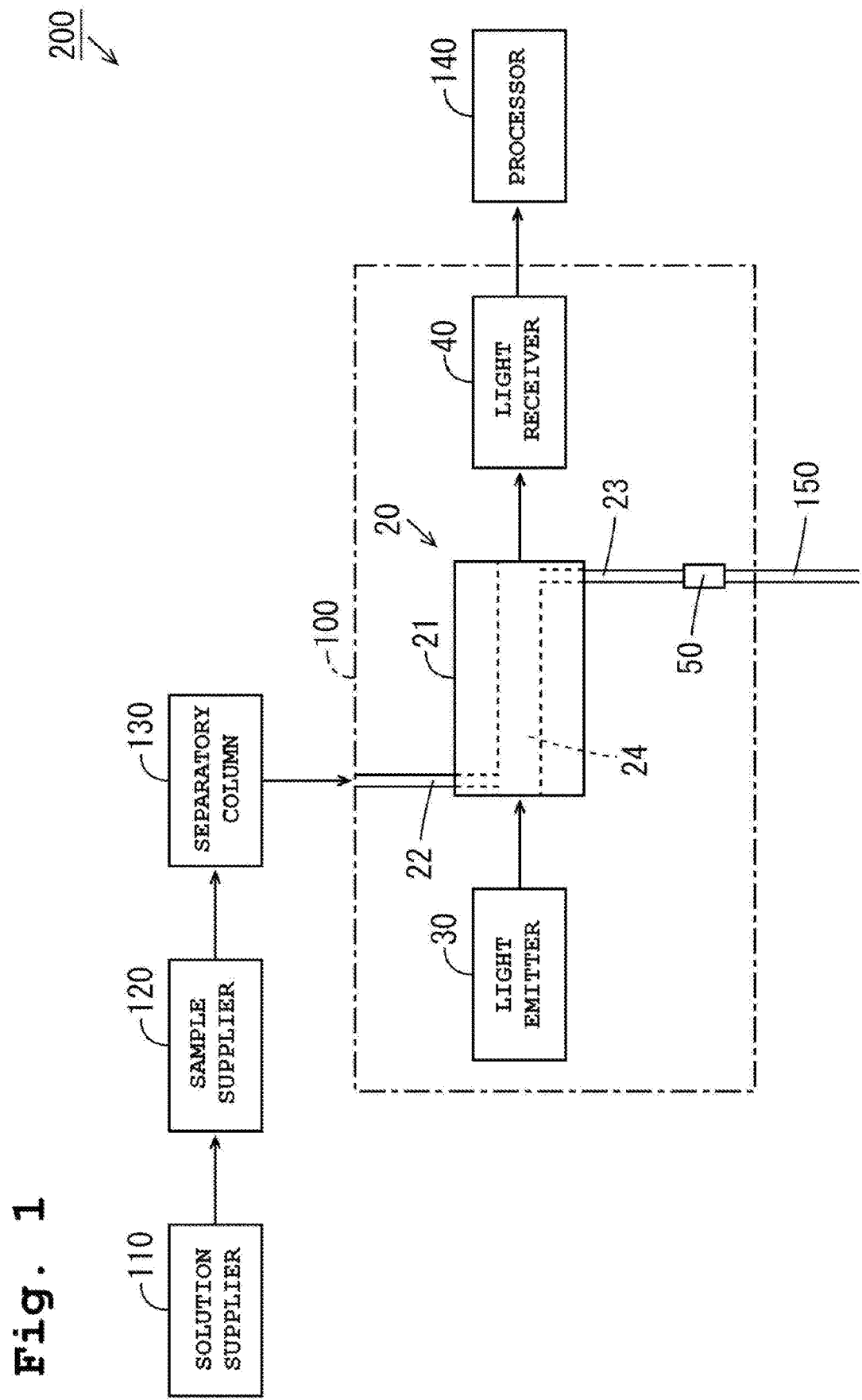
FIG. 1 is a diagram illustrating the configuration of a chromatograph apparatus including a chromatography detector according to one embodiment of the present invention.

A chromatography detector according to embodiments of the present invention is described in detail hereinafter with reference to the drawings. FIG. 1 is a diagram illustrating the configuration of a chromatograph apparatus including a chromatography detector according to one embodiment of the present invention. As illustrated in FIG. 1, a chromatograph apparatus 200 includes a chromatography detector 100, a solution supplier 110, a sample supplier 120, a separatory column 130, and a processor 140.

The solution supplier 110 includes, for example, a solution bottle, a liquid delivery pump, a degasser, and a gradient mixer. The solution supplier 110 supplies a solution such as an aqueous solution, an organic solvent, or a mixture thereof, as the mobile phase. The sample supplier 120 is, for example, an injector, and introduces an analysis target sample, together with the solution supplied by the solution supplier 110, into the separatory column 130. The separatory column 130 is housed in an unillustrated constant temperature column oven, and is adjusted to a predetermined fixed temperature. The separatory column 130 separates the introduced sample into components according to the chemical properties or composition differences.

The chromatography detector 100 detects the components of the sample separated by the separatory column 130. Although the detailed configuration of the chromatography detector 100 is described below, the chromatography detector 100 mainly includes a flow cell 20, a light emitter 30, a light receiver 40, and a connecting member 50. The flow cell 20 includes a main body 21, inlet tubing 22, and outlet tubing 23. A flow path 24 is formed in the main body 21. The outlet tubing 23 is connected by the connecting member 50 to tubing 150 of an external device of the flow cell 20 (hereinafter referred to as the external tubing).

The sample and solution that have passed through the separatory column 130 are introduced into the flow path 24 of the main body 21 through the inlet tubing 22. The sample and solution then flow through the flow path 24 in one direction. The sample and solution are then discharged into the unillustrated external device from the flow path 24 through the outlet tubing 23 and the external tubing 150.

The light emitter 30 includes a light source such as a deuterium lamp, and applies light to the sample flowing through the flow path 24 of the flow cell 20. The light applied to the sample interacts with the sample, and then passes through the sample. The light receiver 40 includes, for example, a photodiode. The light receiver 40 receives the light that has passed through the sample, and outputs a signal indicating the amount of light received to the processor 140. The processor 140 processes the detection result of the chromatography detector 100 to generate a chromatogram presenting the relationship between the holding time and the detection intensity of each component.

(2) Chromatography Detector

Figure 2:
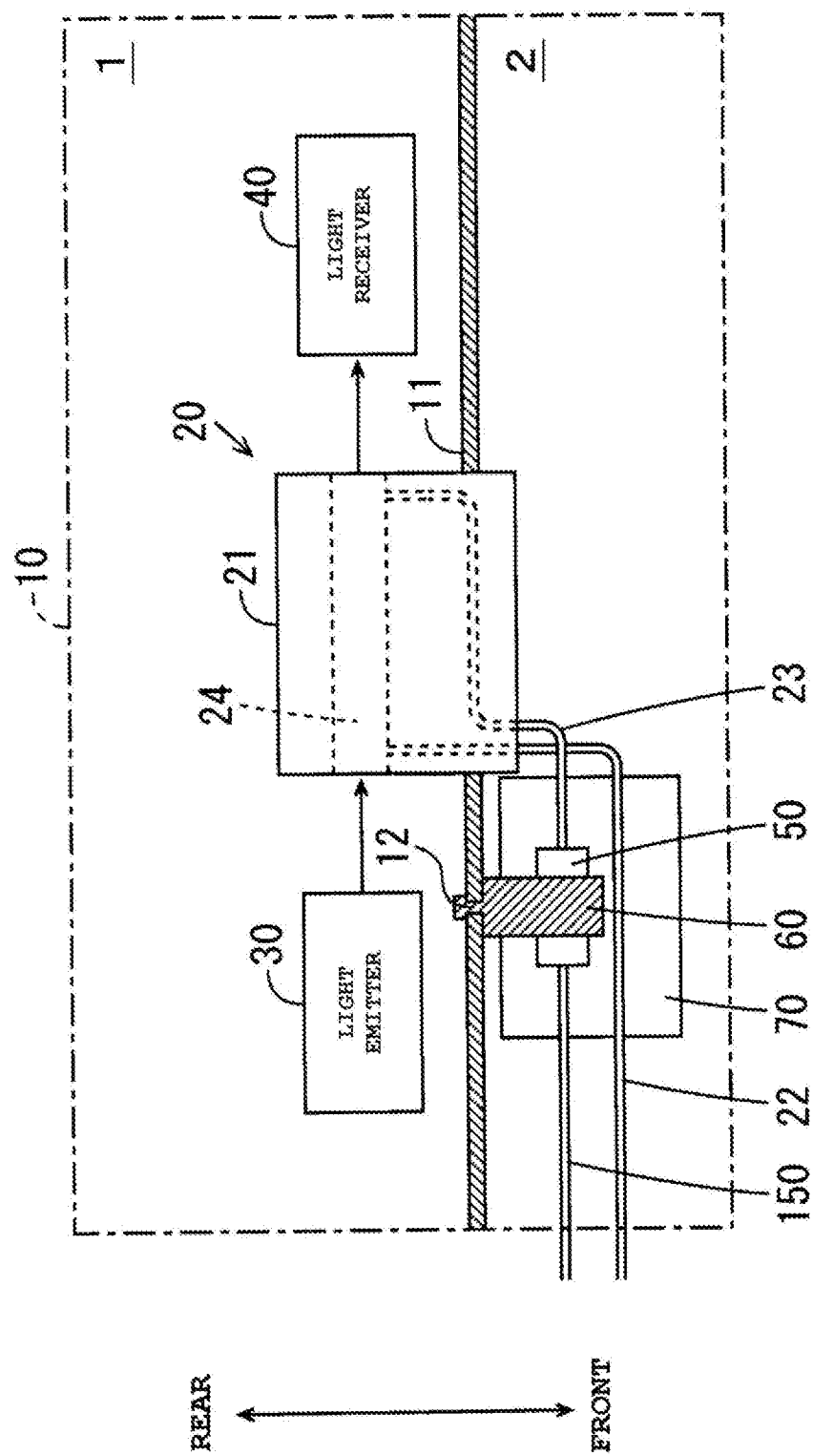
FIG. 2 is a schematic diagram illustrating the structure of the chromatography detector of FIG. 1.

FIG. 2 is a schematic diagram illustrating the structure of the chromatography detector 100 of FIG. 1. As illustrated in FIG. 2, the chromatography detector 100 includes a casing 10, the flow cell 20, the light emitter 30, the light receiver 40, the connecting member 50, a securing member 60, and a tray 70. The casing 10 includes a wall member 11, and houses the flow cell 20, the light emitter 30, the light receiver 40, the connecting member 50, the securing member 60, and the tray 70.

The wall member 11 includes a through-hole 12, and partitions an area in the casing 10 into a first area 1 and a second area 2. Consequently, the first area 1 and the second area 2 are arranged along one direction. In the following description, a direction where the first area 1 is located is called rear, and a direction where the second area 2 is located is called front. Moreover, a direction where gravity acts is called down, and a direction opposite to down is called up. The light emitter 30 and the light receiver 40 are placed in the first area 1. The connecting member 50 and the tray 70 are placed in the second area 2 in the casing 10.

The main body 21 of the flow cell 20 is attached to the wall member 11 in a state where a portion including the flow path 24 is located in the first area 1 and the other portion is located in the second area 2. In the first area 1, the light emitter 30 applies light to the sample flowing through the flow path 24 of the flow cell 20, and the light receiver 40 receives the light that has passed through the sample. The inlet tubing 22 of the flow cell 20 is drawn to the second area 2 and then connected to the separatory column 130 of FIG. 1. The outlet tubing 23 of the flow cell 20 is drawn to the second area 2 and then connected to the external tubing 150 by the connecting member 50.

The connecting member 50 includes an unillustrated fastener such as a nut. A user can connect the outlet tubing 23 and the external tubing 150 by tightening the fastener. The securing member 60 is attached to the wall member 11 in the second area 2 in a state of holding the connecting member 50. Consequently, the connecting member 50 is secured to the wall member 11. The securing member 60 preferably includes a member having high corrosion resistance. In the embodiment, the securing member 60 includes a resin member. The securing member 60 is described in detail below.

If the user does not tighten the fastener of the connecting member 50 sufficiently, the connection by the connecting member 50 between the outlet tubing 23 and the external tubing 150 is insufficient. The fluid leaks out of the portion connected by the connecting member 50. Hence, the tray 70 is provided below the securing member 60 that holds the connecting member 50. If the fluid leaks out of the portion connected by the connecting member 50, the tray 70 receives and stores the leaked solution.

An unillustrated lid is provided at the front of the casing 10. The lid is removed to expose the second area 2 to the front of the casing 10 and make the second area 2 accessible to the user. The user can tighten the fastener of the connecting member 50, or replace or maintain, for example, clean, the tray 70, from the front of the casing 10.

(3) Securing Member

Figure 3:
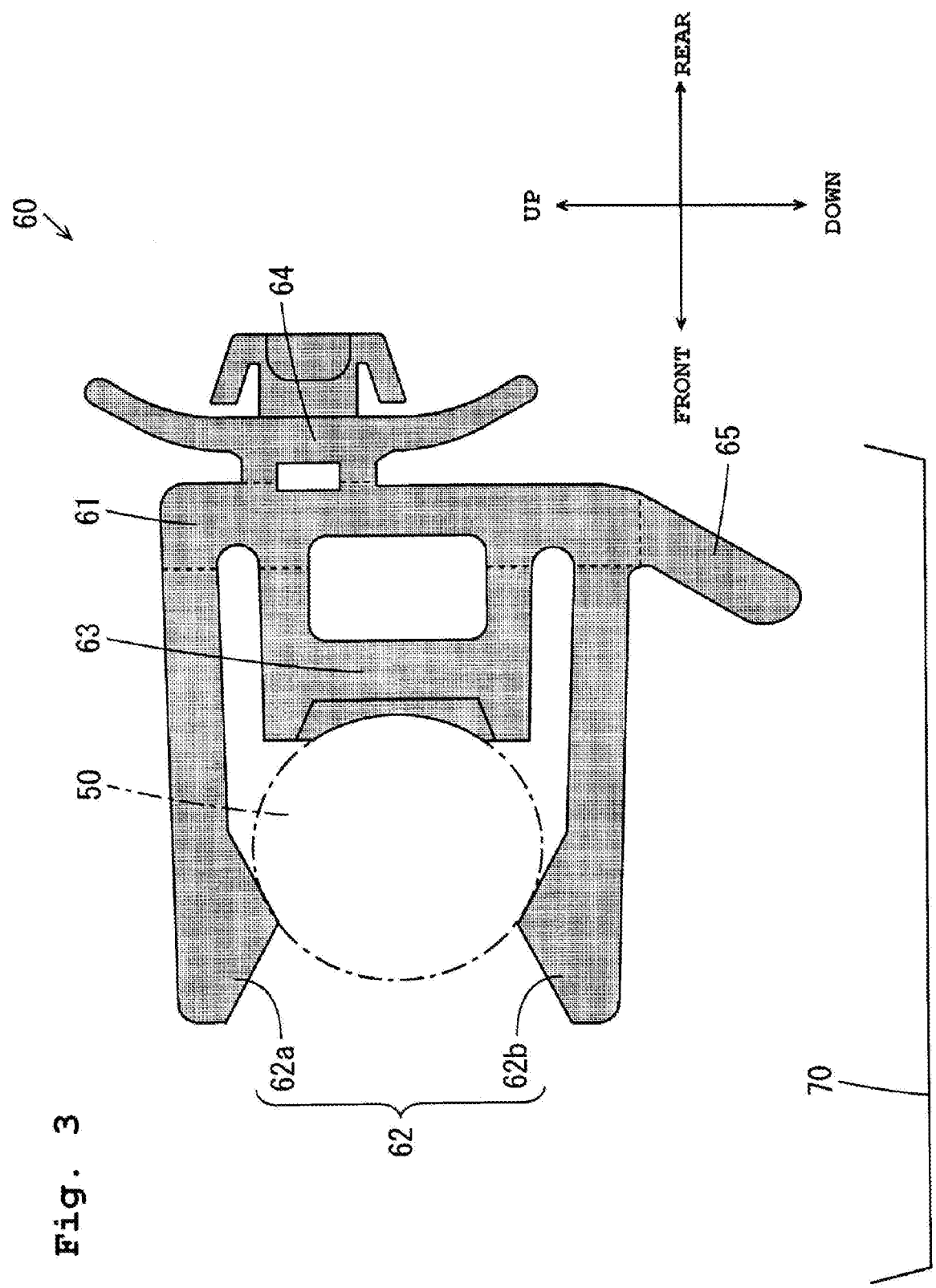
FIG. 3 is a side view illustrating a securing member of FIG. 2.
Figure 4:
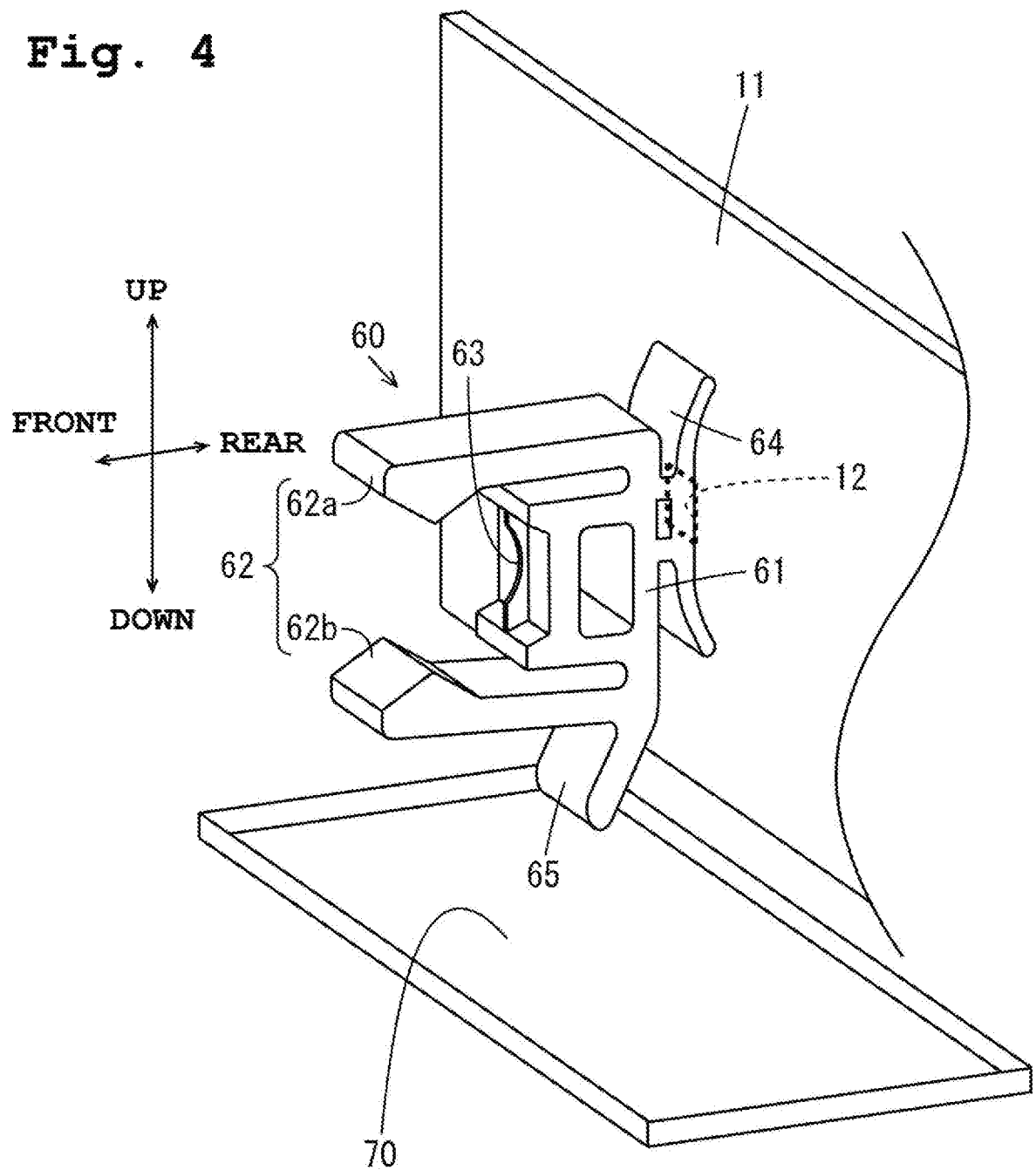
FIG. 4 is a perspective view illustrating the securing member in a state of being attached to a wall member.

FIG. 3 is a side view illustrating the securing member 60 of FIG. 2. FIG. 4 is a perspective view illustrating the securing member 60 in a state of being attached to the wall member 11. As illustrated in FIGS. 3 and 4, the securing member 60 includes a base 61, a holder 62, a contact portion 63, an attachment 64, and a fluid guide 65. A recess is made in a part of the securing member 60 to reduce the weight. In FIG. 3, a dot pattern is provided to the securing member 60 to facilitate the visual recognition of the weight-reduced part of the securing member 60.

The base 61 extends in the up-and-down direction. In FIG. 3, boundaries between the base 61 and the other parts of the securing member 60 are illustrated by dotted lines. The holder 62 is configured in such a manner as to hold the connecting member 50, and includes an upper holder 62a and a lower holder 62b in the embodiment. The upper holder 62a is formed in such a manner as to extend to the front from an upper end of the base 61. The lower holder 62b is formed in such a manner as to extend to the front from a lower end of the base 61. The connecting member 50 is held by the upper holder 62a and the lower holder 62b.

The contact portion 63 is formed in such a manner as to protrude to the front from a substantially center portion of the base 61 in the up-and-down direction. An end surface at a distal end of the contact portion 63 has substantially the same shape as an outer peripheral surface of the connecting member 50. The distal end of the contact portion 63 comes into contact with the outer peripheral surface of the connecting member 50 between the upper holder 62*a* and the lower holder 62*b*. In this case, the securing member 60 can hold the connecting member 50 more stably.

The attachment 64 is formed in such a manner as to extend to the rear from the base 61. A rear end of the attachment 64 is inserted through the through-hole 12 of the wall member 11. Consequently, the securing member 60 is attached to the wall member 11. As long as the securing member 60 can be held on the wall member 11, the attachment 64 and the through-hole 12 may have any shapes.

In the embodiment, the fluid guide 65 is formed in such a manner as to extend from the base 61 toward the tray 70. According to this configuration, if the solution leaks out of the connecting member 50, the leaked solution is guided by the fluid guide 65 to the tray 70 below the securing member 60 without being guided to the through-hole 12 along the lower holder 62*b*.

Figure 5:
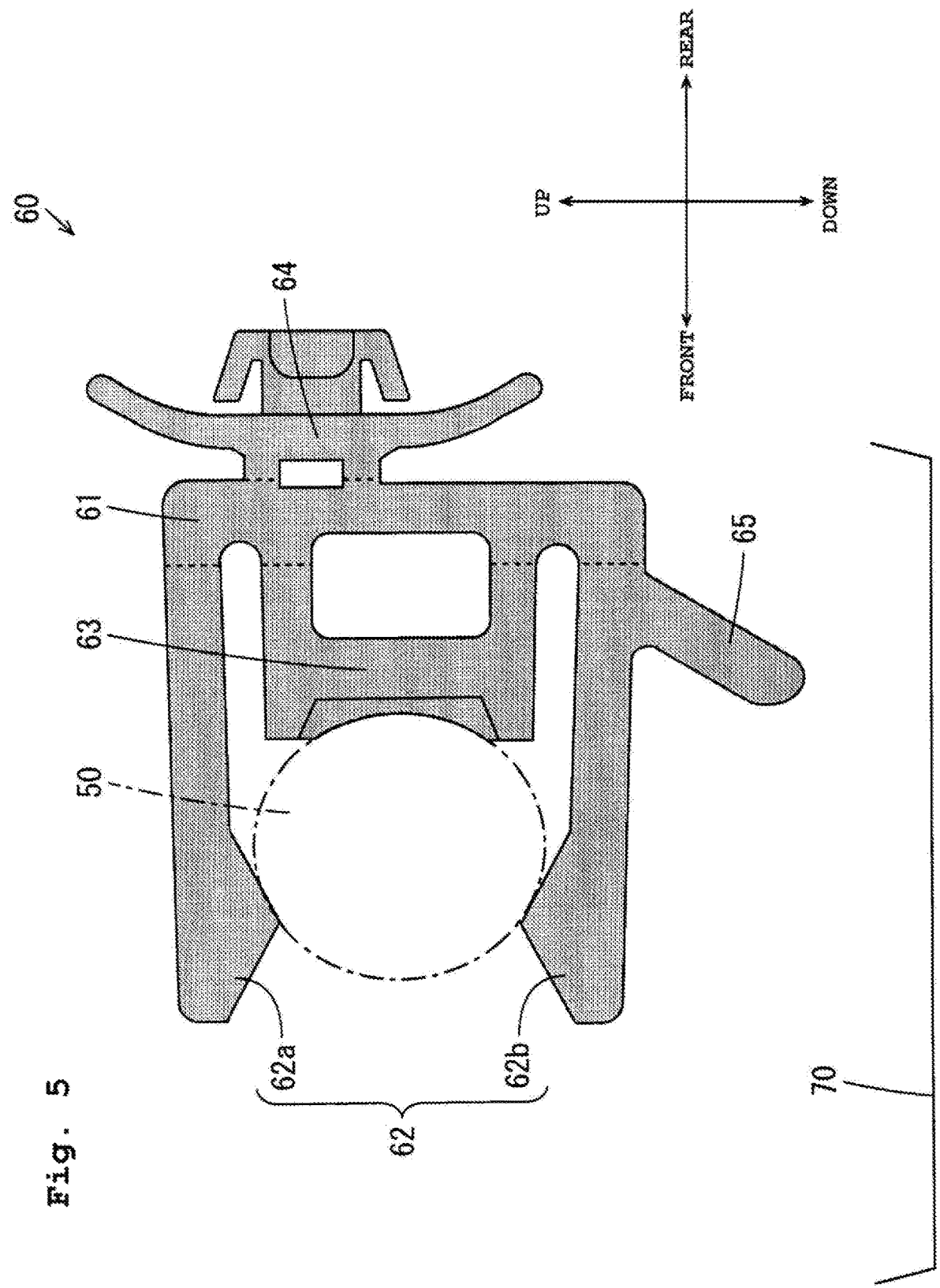
FIG. 5 is a side view illustrating the securing member in a first modification.

In the examples of FIGS. 3 and 4, the fluid guide 65 is formed on the base 61. However, embodiments are not limited to this. FIG. 5 is a side view illustrating the securing member 60 in a first modification. As illustrated in FIG. 5, the fluid guide 65 may be formed in such a manner as to extend from the lower holder 62*b* toward the tray 70.

Figure 6:
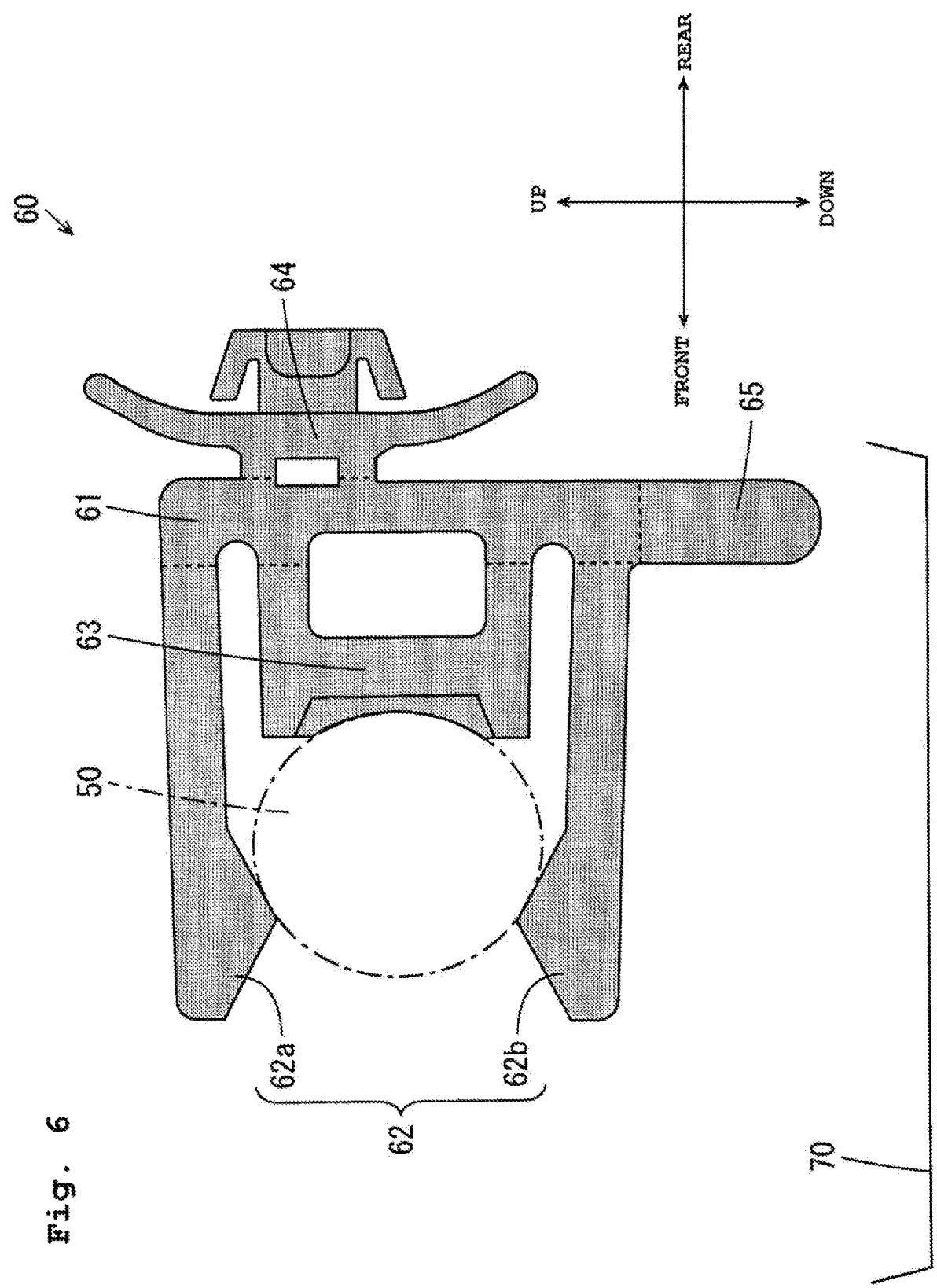
FIG. 6 is a side view illustrating the securing member in a second modification.

In the examples of FIGS. 3 and 4, the fluid guide 65 is formed in such a manner as to extend diagonally downward. However, embodiments are not limited to this. FIG. 6 is a side view illustrating the securing member 60 in a second modification. As illustrated in FIG. 6, the fluid guide 65 may be formed in such a manner as to extend straight down from the base 61. Alternatively, the fluid guide 65 may be formed in such a manner as to extend straight down from the lower holder 62*b*.

(4) Effects

In the chromatography detector 100 according to the embodiment, the outlet tubing 23 of the flow cell 20 and the external tubing 150 outside the flow cell 20 are connected by the connecting member 50. Moreover, the sample and the solution are discharged from the flow path 24 of the flow cell 20 through the outlet tubing 23. The connecting member 50 is held by the holder 62 of the securing member 60. In this state, the attachment 64 of the securing member 60 is inserted through the through-hole 12 of the wall member 11 to secure the connecting member 50 to the wall member 11. The tray 70 is provided below the securing member 60.

If, in this configuration, the connection by the connecting member 50 between the outlet tubing 23 and the external tubing 150 is insufficient, the fluid leaks out of the portion connected by the connecting member 50. Even in such a case, the solution leaked out of the connecting member 50 is guided to the tray 70 by the fluid guide 65 of the securing member 60. Hence, the leaked solution is prevented from spreading over a wide area through the through-hole 12 of the wall member 11, and it becomes possible to collect the leaked solution in the tray 70. Therefore, the solution does not adhere to another member. Consequently, it is possible to prevent the deterioration of the chromatography detector 100 due to a fluid leak.

Especially, in the embodiment, the first area 1 where the light emitter 30 and the light receiver 40 are placed and the second area 2 where the connecting member 50 and the tray 70 are placed are separated by the wall member 11, which prevents the solution leaked out of the connecting member 50 from spreading through the through-hole 12 of the wall member 11. Accordingly, the solution does not adhere to the light emitter 30 or the light receiver 40. Consequently, it is possible to easily prevent the deterioration of the light emitter 30 or the light receiver 40 due to a fluid leak.

(5) Another Embodiment

In the above embodiment, the wall member 11 is a partition that partitions the area in the casing 10 into the first area 1 and the second area 2. However, embodiments are not limited to this. The wall member 11 may be any of side walls forming the casing 10. Also in this case, the solution leaked out of the connecting member 50 is prevented from spreading through the through-hole 12 of the wall member 11. Accordingly, the solution does not adhere to a member outside the casing 10. Consequently, it is possible to prevent the deterioration of the member outside the casing 10 due to a fluid leak.

(6) Aspects (First Aspect)

In this chromatography detector, the outlet tubing of the flow cell and the external tubing outside the flow cell are connected by the connecting member. The sample and the solution are discharged from the flow path of the flow cell through the outlet tubing. The connecting member is held by the holder of the securing member. The attachment of the securing member is inserted through the through-hole of the wall member in this state to secure the connecting member to the wall member. The tray is provided below the securing member.

If, in this configuration, the connection by the connecting member between the outlet tubing and the external tubing is insufficient, the fluid leaks out of the portion connected by the connecting member. Even in such a case, the solution leaked out of the connecting member is guided to the tray by the fluid guide of the securing member. Hence, the leaked solution is prevented from spreading over a wide area through the through-hole of the wall member. It becomes possible to collect the leaked solution in the tray. Therefore, the solution does not adhere to another member. Consequently, it is possible to prevent the deterioration of the chromatography detector due to a fluid leak.

(Second Aspect)

In this case, the first area where the light emitter and the light receiver are placed and the second area where the connecting member and the tray are placed are separated by the wall member, which prevents the solution leaked out of the connecting member from spreading through the through-hole of the wall member. Accordingly, the solution does not adhere to the light emitter or the light receiver. Consequently, it is possible to easily prevent the deterioration of the light emitter or the light receiver due to a fluid leak.

(Third Aspect)

In this case, it is possible to easily guide the solution leaked out of the connecting member to the tray.

(Fourth Aspect)

In this case, it is possible to easily guide the solution leaked out of the connecting member to the tray without making the shape of the securing member complicated.

(Fifth Aspect)

In this case, it is possible to easily guide the solution leaked out of the connecting member to the tray without making the shape of the securing member complicated.

What is claimed is:

1. A chromatography detector that detects components of a sample having passed through a separatory column in a chromatograph apparatus, the chromatography detector comprising:
- a flow cell with a flow path where the sample and a solution flow, the flow cell including outlet tubing that discharges the sample and the solution from the flow path;
- a connecting member configured to connect the outlet tubing of the flow cell and external tubing outside the flow cell;
- a wall member including a through-hole;
- a securing member configured to secure the connecting member to the wall member; and
- a tray below the securing member, wherein
the securing member includes
- a holder configured to hold the connecting member,
- an attachment configured to be inserted through the through-hole of the wall member, and
- a fluid guide formed in such a manner as to, upon the solution leaking out of the connecting member, guide the leaked solution to the tray.

2. The chromatography detector according to claim 1, further comprising:
- a light emitter configured to emit light to the sample flowing through the flow path of the flow cell;
- a light receiver configured to receive the light that has been emitted by the light emitter and has passed through the sample, and output a signal indicating the amount of light received; and
- a casing, wherein
the wall member partitions an area in the casing into a first and a second area,
the light emitter and the light receiver are placed in the first area in the casing, and
the connecting member and the tray are placed in the second area in the casing.

3. The chromatography detector according to claim 1, wherein the fluid guide is formed in such a manner as to extend toward the tray.

4. The chromatography detector according to claim 3, wherein
- the securing member further includes a base extending in an up-and-down direction,
- the holder is formed in such a manner as to extend from the base in one direction intersecting with the up-and-down direction,
- the attachment is formed in such a manner as to extend from the base in a direction opposite to the one direction, and
- the fluid guide is formed in such a manner as to extend from the base toward the tray.

5. The chromatography detector according to claim 3, wherein
- the holder includes an upper holder and a lower holder below the upper holder,
- the connecting member is held by the upper and lower holders, and
- the fluid guide is formed in such a manner as to extend from the lower holder toward the tray.

6. The chromatography detector according to claim 5, wherein
upon the solution leaking out of the connecting member, the fluid guide guides the leaked solution to the tray without being guided to the through-hole along the lower holder.

7. The chromatography detector according to claim 1, wherein
the fluid guide extends diagonally downward.

8. The chromatography detector according to claim 1, wherein
- the securing member further includes a contact portion,
- the contact portion is formed in such a manner as to protrude to the front from a substantially center portion of the base in the up-and-down direction,
- an end surface at a distal end of the contact portion has substantially the same shape as an outer peripheral surface of the connecting member, and
- the distal end of the contact portion comes into contact with the outer peripheral surface of the connecting member between the upper holder and the lower holder.

* * * * *